US012694144B2

(12) United States Patent
Osborn et al.

(10) Patent No.: US 12,694,144 B2
(45) Date of Patent: Jul. 28, 2026

(54) COMPUTER-BASED SYSTEMS CONFIGURED FOR ACCESSING ELECTRONIC DATA SOURCES WITH INVISIBLE AUTHENTICATION AND LAUNCHING, AND COMPUTER-BASED METHODS OF USE THEREOF

(71) Applicant: Capital One Services, LLC, McLean, VA (US)

(72) Inventors: Kevin Osborn, Newton Highlands, MA (US); Xin Sun, Pleasanton, CA (US); Amy Lee McNulty, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 45 days.

(21) Appl. No.: 18/774,142

(22) Filed: Jul. 16, 2024

(65) Prior Publication Data

US 2026/0023866 A1 Jan. 22, 2026

(51) Int. Cl.
*G06F 21/62* (2013.01)
*G06F 21/60* (2013.01)

(52) U.S. Cl.
CPC ........ *G06F 21/6218* (2013.01); *G06F 21/602* (2013.01)

(58) Field of Classification Search
CPC ........................... G06F 21/6218; G06F 21/602
See application file for complete search history.

(56) References Cited

U.S. PATENT DOCUMENTS

| | | | | |
|---|---|---|---|---|
| 7,146,505 | B1 * | 12/2006 | Harada | H04L 67/02 726/13 |
| 8,402,520 | B1 * | 3/2013 | Painter | G06F 21/445 726/5 |
| 9,282,098 | B1 * | 3/2016 | Hitchcock | H04L 67/56 |
| 9,379,890 | B1 * | 6/2016 | Blakely | H04L 9/0822 |
| 10,198,595 | B2 * | 2/2019 | Lancaster | H04L 63/10 |
| 10,574,442 | B2 * | 2/2020 | Amiri | H04L 9/0822 |
| 10,691,825 | B2 * | 6/2020 | Jones | G06F 21/60 |
| 11,165,586 | B1 * | 11/2021 | Rule | H04L 63/0807 |
| 11,245,672 | B2 * | 2/2022 | Eldar | G06F 21/6209 |
| 11,403,637 | B2 * | 8/2022 | Lacoss-Arnold | G06Q 20/3674 |
| 11,568,409 | B2 * | 1/2023 | Li | G06Q 20/085 |

(Continued)

*Primary Examiner* — Gary S Gracia
(74) *Attorney, Agent, or Firm* — GREENBERG TRAURIG, LLP

(57) ABSTRACT

The present disclosure describes a server computing device configured for receiving from a remote computing device via an application, in response to a low-risk access request to a data resource, a programming call with a URL comprising an second identification data item encrypted from a first identification data item acquired by the remote computing device, obtaining a first context information item associated with the programming call, inputting the first context information item into a machine learning model to generate a second context information item, extracting the second identification data item from the URL, generating a third identification data item by decrypting the second identification data item, retrieving a prestored property data item associated with the third identification data item, and transmitting requested data to the remote computing device if comparing the second context information with the prestored property data item produces a match.

17 Claims, 4 Drawing Sheets

(56)     References Cited

U.S. PATENT DOCUMENTS

| | | | |
|---|---|---|---|
| 2012/0158564 A1* | 6/2012 | Lim | G06Q 40/00 |
| | | | 705/35 |
| 2016/0241522 A1* | 8/2016 | Tien | G06F 21/6218 |
| 2018/0189788 A1* | 7/2018 | Lacoss-Arnold | |
| | | | G06Q 20/4014 |
| 2018/0232734 A1* | 8/2018 | Smets | G06Q 20/40 |
| 2020/0099683 A1* | 3/2020 | Alexander | G06F 21/30 |
| 2020/0235996 A1* | 7/2020 | Garg | H04L 41/0823 |
| 2020/0252745 A1* | 8/2020 | Bellenger | H04W 48/04 |
| 2021/0133748 A1* | 5/2021 | Li | G06Q 20/085 |
| 2021/0319427 A1* | 10/2021 | Rule | G06Q 20/3263 |
| 2022/0027750 A1* | 1/2022 | Poli | G06N 20/00 |
| 2022/0414648 A1* | 12/2022 | Rule | G06N 20/00 |
| 2023/0376936 A1* | 11/2023 | Lutz | G06Q 20/352 |
| 2024/0291824 A1* | 8/2024 | Murray | H04L 63/104 |
| 2024/0419824 A1* | 12/2024 | Rodriguez | G06F 21/602 |
| 2026/0023866 A1* | 1/2026 | Osborn | G06F 21/6218 |

* cited by examiner

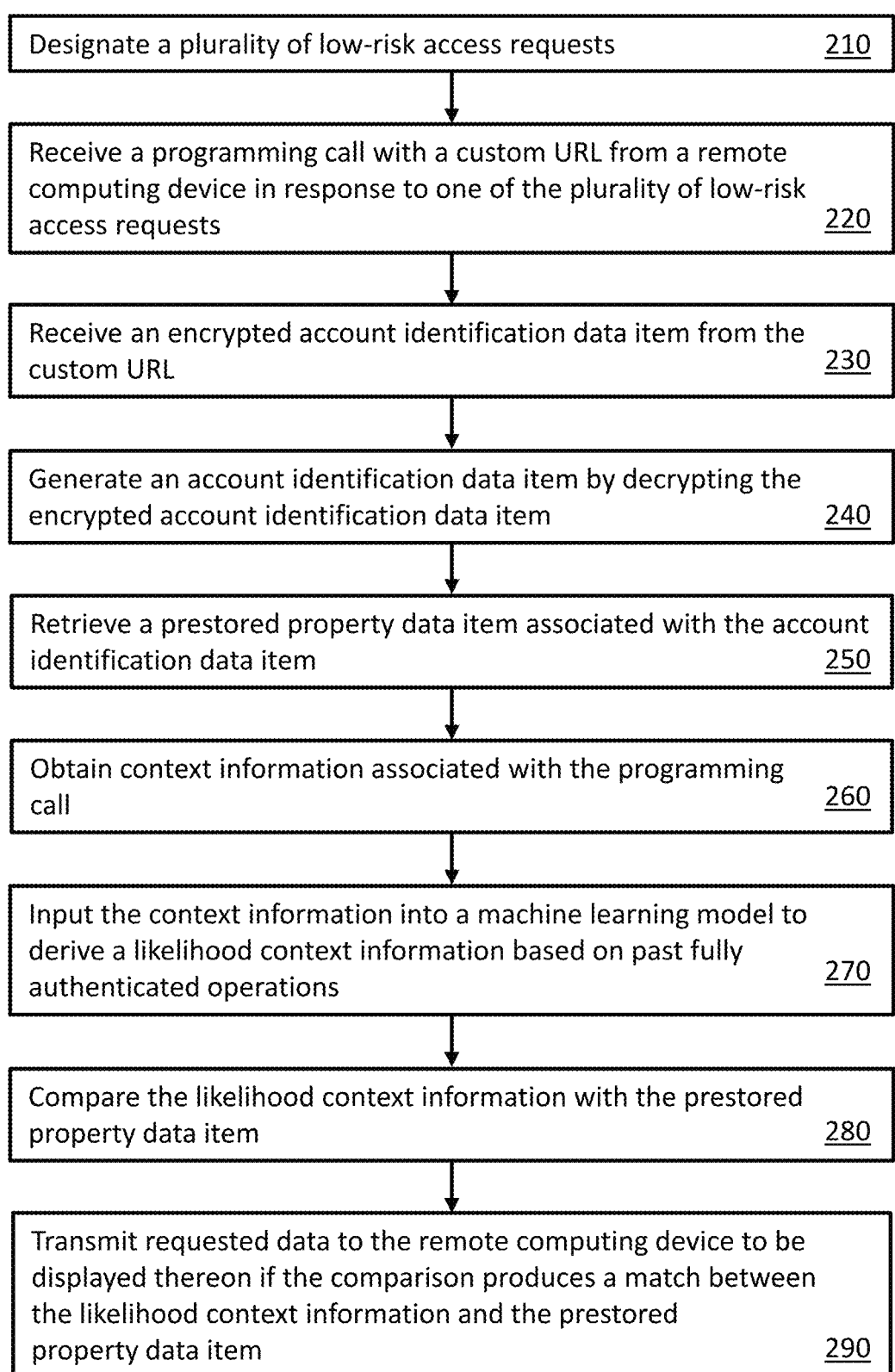

| Designate a plurality of low-risk access requests | 210 |

| Receive a programming call with a custom URL from a remote computing device in response to one of the plurality of low-risk access requests | 220 |

| Receive an encrypted account identification data item from the custom URL | 230 |

| Generate an account identification data item by decrypting the encrypted account identification data item | 240 |

| Retrieve a prestored property data item associated with the account identification data item | 250 |

| Obtain context information associated with the programming call | 260 |

| Input the context information into a machine learning model to derive a likelihood context information based on past fully authenticated operations | 270 |

| Compare the likelihood context information with the prestored property data item | 280 |

| Transmit requested data to the remote computing device to be displayed thereon if the comparison produces a match between the likelihood context information and the prestored property data item | 290 |

FIG. 2

COMPUTER-BASED SYSTEMS CONFIGURED FOR ACCESSING ELECTRONIC DATA SOURCES WITH INVISIBLE AUTHENTICATION AND LAUNCHING, AND COMPUTER-BASED METHODS OF USE THEREOF

FIELD OF TECHNOLOGY

The present disclosure generally relates to automated electronic resource management systems, and more particularly to computer-based systems configured for accessing and launching the electronic resources and methods of use thereof.

BACKGROUND OF TECHNOLOGY

With the wide use of personal computing devices, such as smartphones or tablets, mobile electronic resource management may have become popular. Mobile electronic resource management may be dependent on the availability of an internet or data connection to the mobile device.

Electronic transmissions through mobile electronic resource management depend on the features of the mobile electronic resource management app provided and typically may include obtaining electronic resource statuses and lists of latest transactions. In order to maintain security, some mobile electronic resource management apps may employ multi-factor authentication (MFA) before a user can access his/her associated electronic resource. Typically, MFA may be an electronic authentication method in which a user may be granted access to a website and/or application only after successfully presenting two or more pieces of evidence (or factors) to an authentication mechanism. One piece of the evidence may be a password entered by the user; and another piece of evidence may be security code the user receives on his/her smartphone.

SUMMARY OF DESCRIBED SUBJECT MATTER

In at least some embodiments, or in combination with at least one other embodiment described herein, the present disclosure provides a technically improved illustrative server computing device configured for receiving from via an application, in response to one of a plurality of low-risk access requests to at least one data resource, a programming call with a uniform resource locator (URL) comprising an encrypted portion of a second identification data item, wherein the encrypted portion has been generated by the remote computing device in response to acquiring and based at least in part on a first identification data item; obtaining a first context information item associated with the programming call; inputting the first context information item into a machine learning model to generate a second context information item; extracting the second identification data item from the URL; generating a third identification data item by decrypting the second identification data item; retrieving a prestored property data item associated with the third identification data item; comparing the second context information item with the prestored property data item; and transmitting requested data to the remote computing device to be displayed by the application if comparing the second context information with the prestored property data item produces a match.

In at least some embodiments, or in combination with at least one other embodiment described herein, the server computing device is further configured for designating the plurality of low-risk access requests and at least one high-risk access request.

In at least some embodiments, or in combination with at least one other embodiment described herein, the at least one electronic data source includes an account in an electronic repository.

In at least some embodiments, or in combination with at least one other embodiment described herein, the plurality of low-risk access requests includes checking account balance, transaction status or transaction history.

In at least some embodiments, or in combination with at least one other embodiment described herein, the first identification data item comprises an account number of the account in the electronic repository.

In at least some embodiments, or in combination with at least one other embodiment described herein, the remote computing device is a smartphone, tablet or a personal computer.

In at least some embodiments, or in combination with at least one other embodiment described herein, acquiring the first identification data item comprises scanning a quick response (QR) code or reading a near-field communication (NFC) tag.

In at least some embodiments, or in combination with at least one other embodiment described herein, the first context information comprises an Internet Protocol (IP) address or a phone number.

In at least some embodiments, or in combination with at least one other embodiment described herein, the machine learning model is trained using past authenticated user data.

In at least some embodiments, or in combination with at least one other embodiment described herein, the encrypting the first identification data item to the second identification data item and the decrypting the second identification data item to the third identification data item use a same cryptographic key provided by the server computing device.

In at least some embodiments, or in combination with at least one other embodiment described herein, the prestored property data item includes a user registered location or a phone number.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2 is a flowchart illustrating an exemplary process of a server application in accordance with one or more embodiments of the present disclosure.

DETAILED DESCRIPTION

Figure 1:
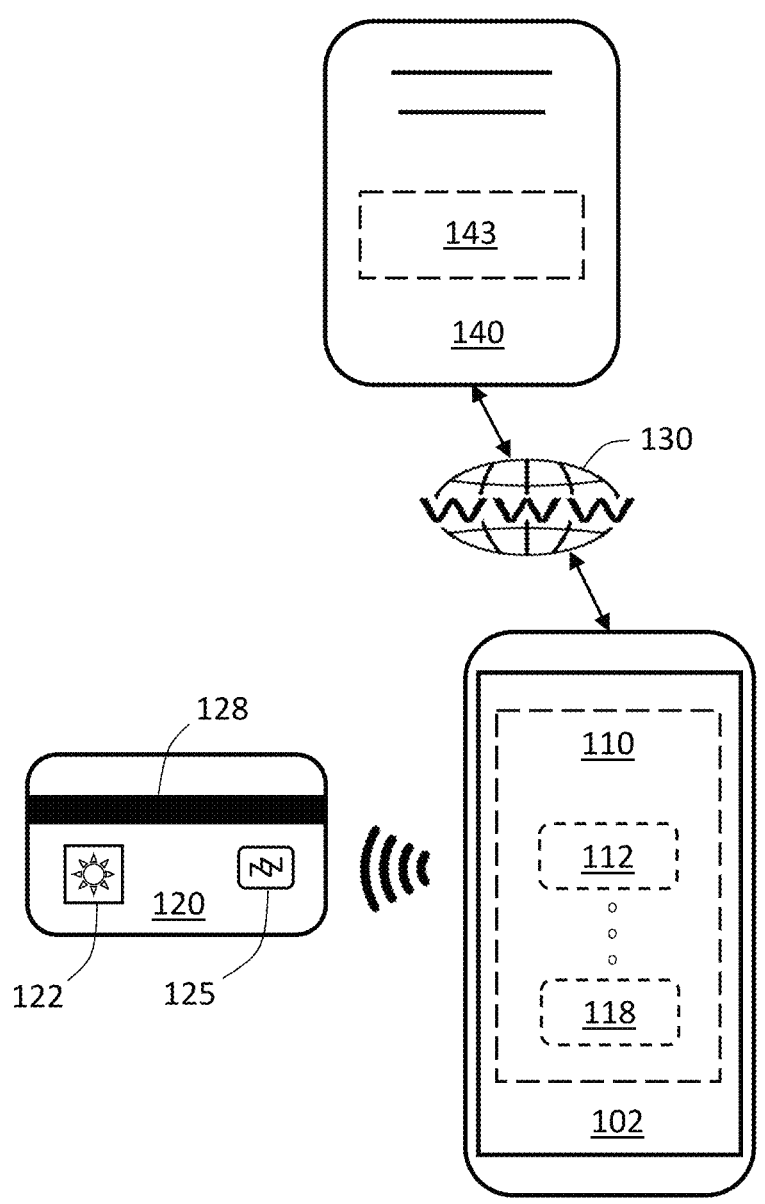
FIG. 1 illustrates a mobile electronic resource management system in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

In at least some embodiments, the present disclosure may be directed to an exemplary method for invisibly authenticating an electronic data source (e.g., bank account) access request.

Typically, maintaining secured mobile electronic resource management through MFA may be cumbersome and time consuming. As not all the electronic resource accesses involve transactions which may be deemed as a high-risk access, for example, a user may just need to check trivial information in an associated electronic resource t or a status or history of transactions. Typically, such informational accesses that may not involve performing status altering actions (e.g., transferring in and/or out data, altering data, etc.) and may be deemed as low-risk accesses. For such a low-risk access, in at least some embodiments, it may be desirable for a mobile electronic resource management system to invisibly authenticate and automatically launch the electronic resource access.

In at least some embodiments, the present disclosure may be directed to addressing a technological problem by conveniently accessing electronic data source (e.g., bank account) information when the access poses low risk to the electronic data source.

At least some embodiments of the present disclosure herein disclose an illustrative server computing device configured for receiving from via an application, in response to one of a plurality of low-risk access requests to at least one data resource, a programming call with a uniform resource locator (URL) comprising an encrypted portion of a second identification data item, wherein the encrypted portion has been generated by the remote computing device in response to acquiring and based at least in part on a first identification data item; obtaining a first context information item associated with the programming call; inputting the first context information item into a machine learning model to generate a second context information item; extracting the second identification data item from the URL; generating a third identification data item by decrypting the second identification data item; retrieving a prestored property data item associated with the third identification data item; comparing the second context information item with the prestored property data item; and transmitting requested data to the remote computing device to be displayed by the application if comparing the second context information with the prestored property data item produces a match.

The term, "data resource" refers exemplarily to an electronic resource management account containing various account information, such as account balances, transaction status and history.

The term "programming call" refers exemplarily to an HTTP request. When you make an HTTP request to a specific URL, you are communicating with a web server to retrieve or send data. This interaction can involve various methods such as GET, POST, PUT, or DELETE, depending on the purpose of the request. Essentially, it's the process of reaching out to a web resource using its unique address (the URL) to perform specific actions or retrieve information.

FIG. 1 illustrates a mobile electronic resource management system in accordance with one or more embodiments of the present disclosure. The mobile electronic resource management system includes an application 110 running on a remote computing device 102, a physical instrument 120, and a web server 140 in communication with the mobile computing device 102 through the Internet 130.

In at least some embodiments or in combination with at least one other embodiment described herein, the remote computing device 102 may be a smartphone, a tablet or a laptop having one or more processors and at least a memory to store instructions of the application 110 for executing by the one or more processors.

In at least some embodiments, or in combination with at least one other embodiment described herein, the application 110 may be custom developed by an electronic repository for use solely by the electronic repository's customers for securely access their accounts. The application 110, once activated, may provide a user interface on the remote computing device 102 to receive user commands and displace data to the user. As shown in FIG. 1, the application 110 displays a plurality of selection buttons 112-118. As an example, the button 112 is for selecting a low-risk access request, such as checking an account balance, a transaction status or account activities; and the button 118 is a log-in button. A user may select to log into his/her account for high-risk access, such as transferring funds or initiating a transaction. Log-in process may require multi-factor authentication to ensure security. The present disclosure describes an exemplary method of invisibly authenticating low-risk access so that a user does not need to go through a log-in process for low-risk accesses.

Referring again to FIG. 1, once the low-risk access request button 112 on the remote computing device 102 is tabbed, the user is prompted to enter a first identification data item into the application 110. In at least some embodiments, or in combination with at least one other embodiment described herein, the first identification data item may be an account number that may be acquired by the remote computing device 102 scanning a special quick response (QR) or bar code 122 printed on a physical instrument 120, such as a bank card. Alternatively, the physical instrument 120 may contain an embedded near-field communication (NFC) tag 125 to wirelessly communicate with the remote computing device 102. In another example, the physical instrument 120 may have a magnetic strip 128 for the remote computing device 102 to scan. The QR or bar code 122, the NFC 125 or magnetic strip 128 is encoded with the first identification data item to be acquired by the application 110 via the remote computing device 102. In yet another example, the first identification data item can be entered directly into the application 110 via a keyboard (not shown) of the remote computing device 102. The keyboard may be an on-screen touch-sensing one on the remote computing device 102 (smartphone or tablet).

Referring again to FIG. 1, the remote computing device 102 may transmit the low-risk access request along with the first identification data item to an electronic resource management application 143 executing on the server computing device 140 via the Internet 130. The electronic resource management application 143 may designate a plurality of low-risk access requests. When one of such low-risk access requests is received, the electronic resource management application 143 executes an invisible authentication process described herein below.

In at least some embodiments, or in combination with at least one other embodiment described herein, the first identification data item is encrypted by a predetermined cryptic key into a second identification data item to be transmitted to the server computing device 130. The second identification data item is then decrypted by the same predetermined cryptic key into a third identification data item, which is then used to identify the requested account.

FIG. 2 is a flowchart illustrating an exemplary process of a server application in accordance with one or more embodiments of the present disclosure. The server application process begins with designating a plurality of low-risk access requests in block 210. In block 220, the server application receives a programming call (web request) with a custom URL from a remote computing device 102 in response to one of the plurality of low-risk access requests. In block 230, the server application receives an encrypted account identification data item from the custom URL. In block 240, the server application generates an account identification data item by decrypting the encrypted account identification data item. A decrypting key is the same key used in encrypting the account identification data item by the client application described herein below.

In block 250, the server application retrieves a prestored property data item associated with the account identification data item. The prestored property data item, for example, may be the user's home location, registered device phone number and/or model.

As shown in FIG. 2, the server application also obtains context information associated with the programming call in block 260. At the time of the URL invocation, the session gathers context information from the web request. In some embodiments, the context information may include an Internet Protocol (IP) address—this can be resolved to rough location through the use of the Internet service provider (ISP) subnet location databases. However, the rough location can vary as the customer may go in and out of the Wi-Fi network. In addition, the user's home IP address may dynamically change. Therefore, the general location obtained from the context information may be used as a parameter along with other specifics to be fed into a machine learning model in block 270 in order to derive a likelihood that the user is in a "customary" area of operation based on past fully authenticated operations. In some embodiments, the context information may include the user's registered device phone number and model.

In at least some embodiments, or in combination with at least one other embodiment described herein, there are known techniques for essentially benchmarking certain graphics operations in a browser, wherein the client code loaded through the URL can also run these tests and report the results back to the server. Since these results may be somewhat inconsistent, likelihood is also derived as part of the above machine learning model.

In at least some embodiments, or in combination with at least one other embodiment, supervised and unsupervised machine learning models can be trained using past authenticated user data to evaluate weakly authenticated data.

Unsupervised machine learning models can be created to explore the inherent structure and characteristic of the authenticated customer data and detect the potential deviations from normal behavior in weakly authenticated data. Supervised machine learning models can also be created for weakly authenticated data that is connected with well-known bad actors (device list associated with identified fraud ring attack).

As shown in FIG. 2, the server application compares the likelihood context information with the prestored property data item in block 280. In block 290, the server application transmits requested data to the remote computing device 102 to be displayed thereon if the comparison produces a match between the likelihood context information and the pre-stored property data item.

Figure 3:
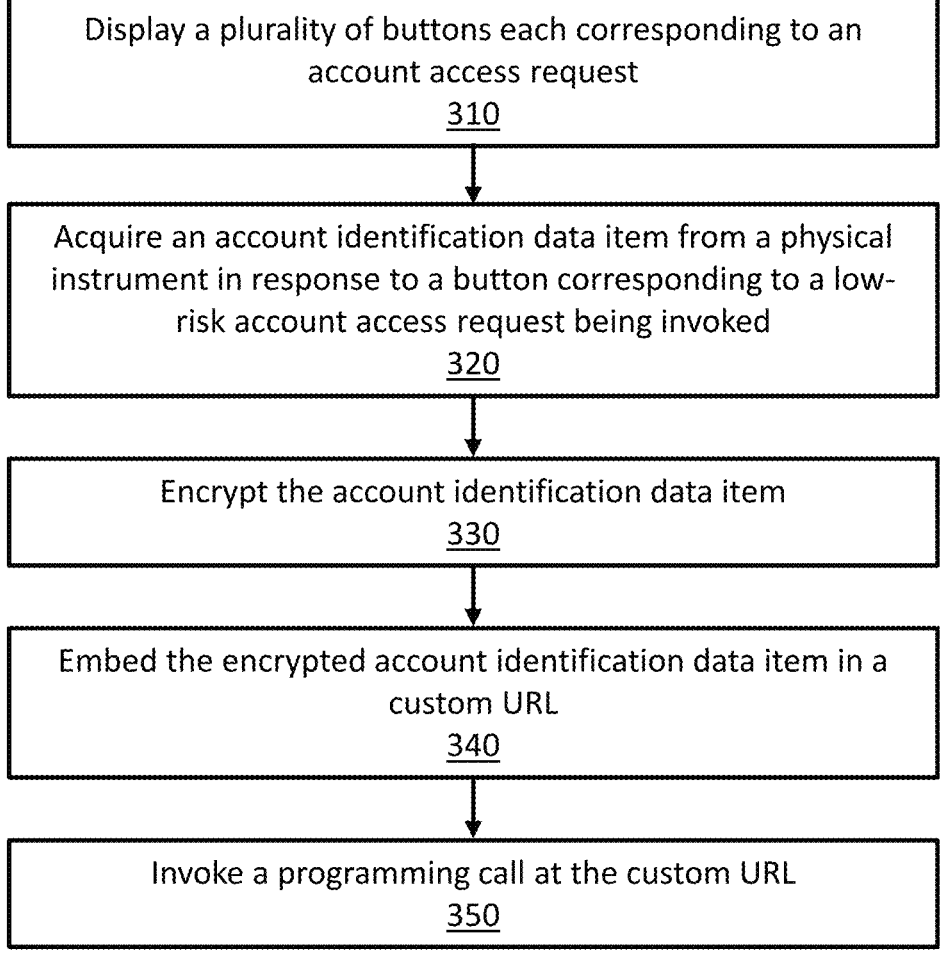
FIG. 3 is a flowchart illustrating an exemplary process of a client application in accordance with one or more embodiments of the present disclosure.

FIG. 3 is a flowchart illustrating an exemplary process of a client application in accordance with one or more embodiments of the present disclosure. The client application belongs to the same electronic resource management system that also employs the server application depicted in FIG. 2.

As shown in FIG. 3, when the client application is activated, a plurality of selection controls such as buttons are displayed on the screen of remote computing device 102 in block 310. Each of the plurality of selection controls corresponds to an account access request. Some of the account access requests are low-risk account access. In block 320, the client application acquires an account identification data item from a physical instrument 120 in response to a button corresponding to a low-risk account access request being invoked. In block 330, the client application encrypts the account identification data item using the same key used by the server application for decrypting the encrypted account identification data item. In block 340, the client application embeds the encrypted account identification data item in a custom URL. In block 350 the client application subsequently invokes a programming call at the custom URL to transmit the low-risk account access request to the server application depicted in FIG. 2.

Referring again to FIG. 2, the server application may automatically authenticate a low-risk access request from the client application without user's log-in, etc., and allow the client application to conveniently launch the requested data. The authentication is invisible to the user at the client application.

Figure 4:
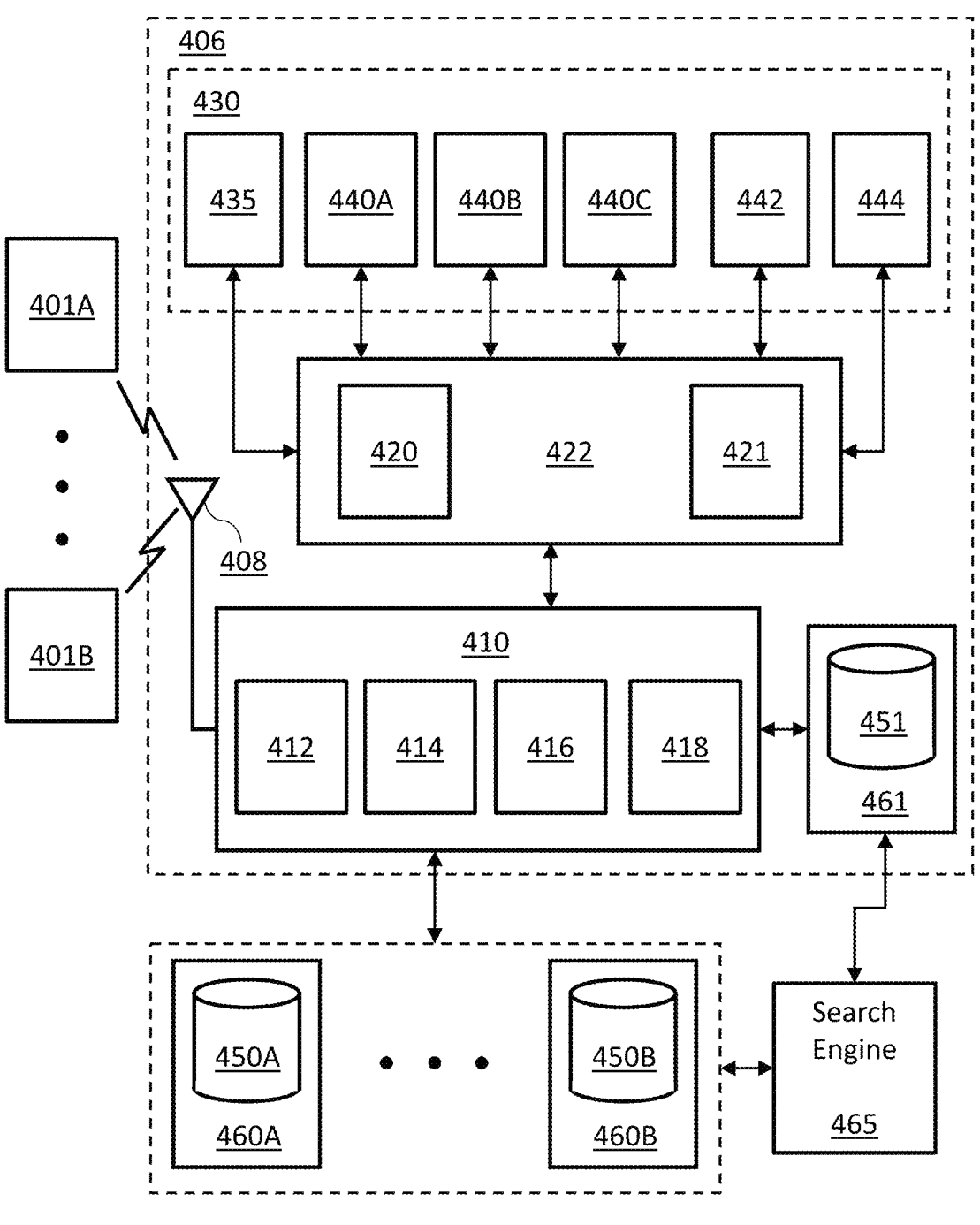
FIG. 4 is a block diagram of a computing system for implementing the processes depicted in FIGS. 2 and 3 in accordance with one or more embodiments of the present disclosure.

FIG. 4 is a block diagram of a computing system 400 for implementing the processes depicted in FIGS. 2 and 3 in accordance with one or more embodiments of the present disclosure. Aspects of the present disclosure may be applied to an exemplary real-time entity-resolution (RTER) microservices platform 406 that may include RTER software modules denoted 435, 440A, 440B, and 440C for implementing the RTER microservices in a service layer 430 as described hereinbelow. At least one search query generator software module 442 may be configured to generate search queries in response to an entity-specific data request for entity-specific data from a user via a graphical user interface (GUI).

In at least some embodiments, or in combination with at least one other embodiment described herein, the RTER microservices platform 406 may include a multi-layered architecture including, for example, the service layer 430, an orchestration layer 422, and a platform layer 410, however other layers may be additionally contemplated. In some embodiments, a plurality of users may interact with the RTER microservices platform 406 via any of N user devices denoted 401A . . . 401B, where N may be an integer. The N user devices denoted 401A . . . 401B may include the GUI for any number of users to interact with the RTER microservices platform 406. FIG. 4 shows the first user device 401A and the Nth user device 401B. Communications from the user devices 401A . . . 401B may be received by a transceiver 408 and may then be routed to an appropriate component of the system, via the platform layer 410, for example.

In at least some embodiments, or in combination with at least one other embodiment described herein, the platform layer 410 may include an input/output (I/O) interface 412 for facilitating data communication to external devices, such as, e.g., the transceiver 408 with any other system devices. The platform layer 410 may also include a runtime environment 414 for implementing programs, services, functionalities and microservices using a plurality of processors 416 and memory devices 418 for implementing the RTER microservices platform 406. The memory devices 418 may include, e.g., temporary storage and caching of data to facilitate resources of the RTER microservices platform 406. In some embodiments, the platform layer 410 includes functionality for, e.g., configuration management, logging and monitoring of data traffic, document management, communication routing, notifications, messaging tools, reporting tools, as well as any other functions pertaining to platform level functionality.

In at least some embodiments, or in combination with at least one other embodiment described herein, a request from any of the user devices 401A and 401B may be routed to an orchestrator 420 in the orchestration layer 422. In other embodiments, the orchestrator 420 may manage operations of the RTER microservices platform 406, including allocation of resources, process schedule with, e.g., the plurality of processors 416, among other tasks. For example, in some embodiments, the orchestrator 420 may include a plurality of application programming interfaces (APIs) 421 for calling services and functions of the RTER microservices platform 406 in interacting with the user devices 401A . . . 401B.

In at least some embodiments, or in combination with at least one other embodiment described herein, the orchestrator 420 may manage operations of microservices in a service layer 430 and coordination of the service layer 430 with the platform layer 410. For example, the service layer 430 may include software modules 435, 440A, 440B, and 440C related to, for example, implementing the RTER microservices platform 406 and the at least one search query generator software module 442 to generate search queries for the search engine 465. In some embodiments, the orchestrator 420 may facilitate aggregation of data from multiple domains in the service layer 430 and/or may orchestrate data-related operations across domains and services to provide for complete experiences within any given domain.

In at least some embodiments, or in combination with at least one other embodiment described herein, the service layer 430 may also include at least one shared microservice 444 that may include functionality that may be shared across multiple domains.

In at least some embodiments, or in combination with at least one other embodiment described herein, the orchestrator 420 may manage the data flow and the execution of microservices such that data may be shared, processed, and returned to any of the N user devices 401A . . . 401B. For example, a user device such as the user device 401A may communicate a request, e.g., a user interaction via a GUI of the user device 401A. The request may be received by the transceiver 408 and routed via the platform layer 410 to the orchestrator 420. A search request may be entered by the user into the GUI on a particular user device from any of the N user devices 401A . . . 401B and the search results may be displayed in the GUI of the particular user device for the user to analyze.

In at least some embodiments, or in combination with at least one other embodiment described herein, the computing system 400 may include a plurality of M electronic resources denoted 460A . . . 460B on which a plurality of M databases may be stored and respectively denoted as 450A . . . 450B where M may be an integer. An additional electronic resource 461 may include an entity profile database 451. The plurality of M electronic resources 460A . . . 460B and the additional electronic resource 461 may be communicatively coupled to the RTER microservices platform 406.

In at least some embodiments, or in combination with at least one other embodiment described herein, the plurality of M databases 450A . . . 450B may include the entity profile database 451. In other embodiments, the entity profile database 451 may be separate from the plurality of M databases 450A . . . 450B. In yet other embodiments, the entity profile database 451 may be separate from, but communicatively coupled to the plurality of M databases 450A 450B.

In at least some embodiments, or in combination with at least one other embodiment described herein, the RTER microservices platform 406 may be communicatively coupled to send and receive data to a search engine 465.

In at least some embodiments, or in combination with at least one other embodiment described herein, the plurality of M electronic resources 460A . . . 460B and the additional electronic resource 461 may be communicatively coupled with the search engine 465.

In at least some embodiments, or in combination with at least one other embodiment described herein, the search engine 465 may be an Elasticsearch search engine. The Elasticsearch search engine may be based on a Lucene library. It may be a distributed, multitenant-capable full-text search engine with a HTTP web interface and schema-free JSON documents.

In at least some embodiments, or in combination with at least one other embodiment described herein, any data stored on any of the plurality of databases 450A . . . 450B, such as entity-specific data associated with any of a plurality of entities may be accessible from the N user devices 401A . . . 401B via any of the plurality of APIs in the orchestrator 420 in the RTER microservices platform 406. User access may require proper user access authentication.

In at least some embodiments, or in combination with at least one other embodiment described herein, each of plurality of M electronic resources (ER) denoted 460A . . . 460B may include at least one ER processor and/or ER controller, ER input and/or ER output devices, and/or ER communication circuitry for communicating over a communication network with any of the elements and/or devices in the computing system 400. API calls via any of the plurality of APIs 421 to the at least ER processor and/or ER controller may be programmed to search for and/or process entity-specific data stored in any of the plurality of M databases.

In at least some embodiments, or in combination with at least one other embodiment described herein, for efficient processing of initial business data for generating the Elas-ticSearch search query, API calls to an entity profile database 451 stored in an electronic resource 461 may include data-reducing hashing functions to reduce the size of the initial business data for a particular business that may be returned to the microservice as compress data. The entity-specific data in the entity profile database 451 may then be decompressed by the original hash function and/or by algorithms based on the hash function used in the original API calls. Moreover, the hash function algorithms may cluster business data features from the compressed data. These clustered features may be used by the algorithms to generate an ElasticSearch query that streamlines the search coverage.

In at least some embodiments, or in combination with at least one other embodiment described herein, the entity profile database 451 from the plurality of M databases 450A . . . 450B may be stored on the electronic resource 461 from the plurality of electronic resources coupled to the microservice RTER platform 406 and/or may require authentication to access.

In at least some embodiments, or in combination with at least one other embodiment described herein, the entity profile database 451 may be separate from the plurality of M databases 450A . . . 450B and may be directly accessible from the microservice RTER platform 406 as shown in FIG. 4.

In at least some embodiments, or in combination with at least one other embodiment described herein, the first exemplary flow for managing the search engine results may further include the orchestrator 420 may join the blocking module 440A output and the scoring module 440C output and may transmit all of the matching pairs, their matching scores, entity (business) firmographics, and/or transaction data to the user on one of the N user devices 401A . . . 101B.

In at least some embodiments, or in combination with at least one other embodiment described herein, a second exemplary flow for managing the search engine results may further include all of the functionality of the module 440B, and/or the scoring module 440C as described herein above. However, to more efficiently manage the search engine results before receiving the search results, the at least one search query generator software module 442 may include an algorithm to take the data in the entity-specific data request to generate the entity-specific database query request that may be crafted to reduce extraneous search results hits.

In at least some embodiments, or in combination with at least one other embodiment described herein, the entity resolution microservice platform 406 may update at least one entity profile in the entity profile database 451 for the at least one entity with the additional entity-specific data.

In at least some embodiments, or in combination with at least one other embodiment described herein, the at least one entity may be a business. The at least one entity profile may be a profile of the business. The entity-specific data may include business data from the search engine associated with the business. Thus, the entity resolution microservice platform 406 may update the profile of the business with the business data received from the search engine 465.

In at least some embodiments, or in combination with at least one other embodiment described herein, the entity resolution microservice platform 406 may receive the search engine results data comprising entity-specific data records. Each entity-specific data record may include a matching score. In other embodiments, the scoring module 440C may generate the matching score. The matching score may be indicative of a match between the entity-specific data in each entity-specific data record and the entity-specific data in the entity-specific database query request associated with the at least one entity.

For example, the previous example described hereinabove illustrates the scoring module 440C assigning a matching score to each of the search results for the entity name in the entity-specific data based on the entity name (Gil Ellis) in the entity-specific data request. However, the types of entity specific data are not limited to the entity name, but may also include the entity owner, the entity address etc. The search results may include search hits for each type of entity-specific data in the entity-specific data request that are each scored within each respective type of entity specific data. The search engine may receive search results hits for the different types of entity-specific data, each receiving a matching score. The search results hit for the different types of entity-specific data may be unordered.

In at least some embodiments, or in combination with at least one other embodiment described herein, the entity resolution microservice platform 406 may perform an ordering of the entity-specific data for each type from a highest matching score to a lowest matching score and to store a secondary file of the search engine results data with entity-specific data records having a predefined number of highest matching scores. The secondary file may include the entity-specific data with the highest matching score for each given type so as to capture, for example, the search hit with the highest matching score for each type (e.g., the entity name, entity address, entity owner name, and the like).

In at least some embodiments, or in combination with at least one other embodiment described herein, the predefined number of highest matching scores may include 40 search engine results with the highest matching scores. The predefined number of highest matching scores may include 400 search engine results with the highest matching scores. The predefined number of highest matching scores may include 500 search engine results with the highest matching scores. The predefined number of highest matching scores may include 4000 search engine results with the highest matching scores. The predefined number of highest matching scores may include 5000 search engine results with the highest matching scores. The predefined number of highest matching scores may include 40,000 search engine results with the highest matching scores.

In at least some embodiments, or in combination with at least one other embodiment described herein, the entity resolution microservice platform 406 may generate an index for each entity-specific data record in the secondary file since the search results hits for the different types of entity-specific data may be unordered.

In at least some embodiments, or in combination with at least one other embodiment described herein, the entity resolution microservice platform 406 may apply the same index during another search to the search engine results data for the entity-specific data associated with the at least one entity in response to another entity-specific data request that generates another entity-specific database query request for the search engine identical to the entity-specific database query request. (Note that the indexing may be applied to either of the first and second exemplary flows or both for managing the search results.)

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment may be implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In at least some embodiments, or in combination with at least one other embodiment described herein, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In at least some embodiments, or in combination with at least one other embodiment described herein, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 41; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21) .NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In at least some embodiments, or in combination with at least one other embodiment described herein, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In at least some embodiments, or in combination with at least one other embodiment described herein, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications for implementing the functions of the CVCP as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

In at least some embodiments, or in combination with at least one other embodiment described herein, exemplary inventive computer-based systems/platforms, exemplary inventive computer-based devices, and/or exemplary inventive computer-based components of the present disclosure may be configured to handle numerous concurrent users via the N user devices 46A and 46B that may be, but is not limited to, at least 400 (e.g., but not limited to, 400-999), at least 4,000 (e.g., but not limited to, 4,000-9,999), at least 40,000 (e.g., but not limited to, 40,000-99,999), at least 400,000 (e.g., but not limited to, 400,000-999,999), at least 4,000,000 (e.g., but not limited to, 4,000,000-9,999,999), at least 40,000,000 (e.g., but not limited to, 40,000,000-99, 999,999), at least 400,000,000 (e.g., but not limited to, 400,000,000-999,999,999), at least 4,000,000,000 (e.g., but not limited to, 4,000,000,000-999,999,999,999), and so on.

In at least some embodiments, or in combination with at least one other embodiment described herein, the illustrative computing devices and the illustrative computing components of the exemplary computer-based system 400 and platform 406 may be configured to manage a large number of members and concurrent transactions, as detailed herein. In some embodiments, the exemplary computer-based system 400 and platform 406 may be based on a scalable computer and network architecture that incorporates various strategies for assessing the data, caching, searching, and/or database connection pooling.

In at least some embodiments, or in combination with at least one other embodiment described herein, the N client (user) devices 401A through 401B may be personal computers, multiprocessor systems, microprocessor-based or programmable consumer electronics, network PCs, and the like. In some embodiments, one or more client devices within the N client devices 401A through 401B may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more client devices within client devices 402 through 404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that may be equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.).

In at least some embodiments, or in combination with at least one other embodiment described herein, one or more client devices within the N client devices 401A through 401B may include may run one or more applications, such as Internet browsers, mobile applications, voice calls, video games, videoconferencing, and email, among others. In some embodiments, one or more client devices within the N client devices 401A through 401B may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 402 through 404 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which may be remotely downloadable by the user using network protocols such as FTP, SSH, or other file transfer mechanisms. In some embodiments, a client device may provide several levels of user interface, for example, advanced user, standard user. In some embodiments, one or more client devices within the N client devices 401A through 401B may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments and, optionally, in combination with any embodiment described above or below, for example, the N client devices 401A through 401B, and/or the exemplary platform 406 may include a specifically programmed software module in the service layer 430 that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

In at least some embodiments, or in combination with at least one other embodiment described herein, the N client devices 401A through 401B as well as the I/O devices in the platform layer 410 may also include a number of external or internal devices such as a mouse, a CD-ROM, DVD, a physical or virtual keyboard, a display, or other input or output devices. In some embodiments, examples of the N client devices 401A through 401B as well as devices in the platform layer 410 may be any type of processor-based platforms that are connected to a network such as, without limitation, personal computers, digital assistants, personal digital assistants, smart phones, pagers, digital tablets, laptop computers, Internet appliances, and other processor-based devices. In some embodiments, client devices @02a through @02n may be specifically programmed with one or more application programs in accordance with one or more principles/methodologies detailed herein. In some embodiments, the N client devices 401A through 401B as well as devices in the platform layer 410 may operate on any operating system capable of supporting a browser or browser-enabled application, such as Microsoft™, Windows™, and/or Linux. In some embodiments, the N client devices 401A through 401B as well as devices in the platform layer 410 shown may include, for example, personal computers executing a browser application program such as Microsoft Corporation's Internet Explorer™, Apple Computer, Inc.'s Safari™, Mozilla Firefox, and/or Opera.

In at least some embodiments, or in combination with at least one other embodiment described herein, at least one database of M exemplary databases 450A . . . 150B may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that may be stored.

In at least some embodiments, or in combination with at least one other embodiment described herein, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS), platform as a service (PaaS), and/or software as a service (SaaS) using a web browser, mobile app, thin client, terminal emulator or other endpoint.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that may be dynamically determined during an execution of a software application or at least a portion of a software application.

In at least some embodiments, or in combination with at least one other embodiment described herein, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

The aforementioned examples are, of course, illustrative and not restrictive.

In at least some embodiments, or in combination with at least one other embodiment described herein, the exemplary inventive computer-based systems/platforms, the exemplary inventive computer-based devices, and/or the exemplary inventive computer-based components of the present disclosure such as for example, the scoring module 440C, may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination with any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination with any embodiment described above or below, an exemplary implementation of Neural Network may be executed as follows:
   i) Define Neural Network architecture/model,
   ii) Transfer the input data to the exemplary neural network model,
   iii) Train the exemplary model incrementally,
   iv) determine the accuracy for a specific number of timesteps,
   v) apply the exemplary trained model to process the newly-received input data,
   vi) optionally and in parallel, continue to train the exemplary trained model with a predetermined periodicity.

In some embodiments and, optionally, in combination with any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination with any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node may be activated. In some embodiments and, optionally, in combination with any embodiment described above or below, the exemplary aggregation function may be a mathematical function that combines (e.g., sum, product, etc.) input signals to the node. In some embodiments and, optionally, in combination with any embodiment described above or below, an output of the exemplary aggregation function may be used as input to the exemplary activation function. In some embodiments and, optionally, in combination with any embodiment described above or below, the bias may be a constant value or function that may be used by the aggregation function and/or the activation function to make the node more or less likely to be activated.

At least some aspects of the present disclosure will now be described with reference to the following numbered clauses.

Clause 1. A method, comprising: receiving, by a server computing device, from a remote computing device via an application, in response to one of a plurality of low-risk access requests to at least one data resource, a programming call with a uniform resource locator (URL) comprising an encrypted portion of a second identification data item, wherein the encrypted portion has been generated by the remote computing device in response to acquiring and based at least in part on a first identification data item; obtaining, by a server computing device, a first context information item associated with the programming call; inputting, by the server computing device, the first context information item into a machine learning model to generate a second context information item; extracting, by the server computing device, the second identification data item from the URL; generating, by the server computing device, a third identification data item by decrypting the second identification data item; retrieving, by the server computing device, a prestored property data item associated with the third identification data item; comparing, by the server computing device, the second context information item with the prestored property data item; and transmitting, by the server computing device, requested data to the remote computing device to be displayed by the application if comparing the second context information with the prestored property data item produces a match.

Clause 2. The method according to clause 1, further comprising designating, by a server computing device, the plurality of low-risk access requests and at least one high-risk access request.

Clause 3. The method according to clause 1, wherein the at least one data resource comprises an account in an electronic repository.

Clause 4. The method according to clause 3, wherein the plurality of low-risk access requests comprises checking account balance, transaction status or transaction history.

Clause 5. The method according to clause 3, wherein the first identification data item comprises an account number of the account in the electronic repository.

Clause 6. The method according to clause 1, wherein remote computing device is a smartphone, tablet or a personal computer.

Clause 7. The method according to clause 1, wherein acquiring, by the remote computing device, the first identification data item comprises scanning a quick response (QR) code or reading a near-field communication (NFC) tag.

Clause 8. The method according to clause 1, wherein first context information comprises an Internet Protocol (IP) address or a phone number.

Clause 9. The method according to clause 1, wherein the machine learning model is trained using past authenticated user data.

Clause 10. The method according to clause 1, wherein the encrypting the first identification data item to the second identification data item and the decrypting the second identification data item to the third identification data item use a same cryptographic key provided by the server computing device.

Clause 11. The method according to clause 1, wherein the prestored property data item comprises a user registered location or a phone number.

Clause 12. A system, comprising: a plurality of processors of a server computing device; and at least one memory storing a plurality of computing instructions configured to instruct at least one of the plurality of processors to: receive from a remote computing device via an application, in response to one of a plurality of low-risk access requests to at least one data resource, a programming call with a uniform resource locator (URL) comprising an encrypted portion of a second identification data item, wherein the encrypted portion has been generated by the remote computing device in response to acquiring and based at least in part on a first identification data item; obtain a first context information item associated with the programming call; input the first context information item into a machine learning model to generate a second context information item; extract the second identification data item from the URL; generate a third identification data item by decrypting the second identification data item; retrieve a prestored property data item associated with the third identification data item; compare the second context information item with the prestored property data item; and transmit requested data to the remote computing device to be displayed by the application if comparing the second context information with the prestored property data item produces a match.

Clause 13. The system according to clause 12, wherein the plurality of computing instructions is further configured to instruct at least one of the plurality of processors to designate the plurality of low-risk access requests and at least one high-risk access request.

Clause 14. The system according to clause 12, wherein the at least one data resource comprises an account in an electronic repository.

Clause 15. The system according to clause 14, wherein the plurality of low-risk access requests comprises checking account balance, transaction status or transaction history.

Clause 16. The system according to clause 14, wherein the first identification data item comprises an account number of the account in the electronic repository.

Clause 17. The system according to clause 12, wherein acquiring the first identification data item comprises scanning a quick response (QR) code or reading a near-field communication (NFC) tag.

Clause 18. The system according to clause 12, wherein the first context information comprises an Internet Protocol (IP) address or a phone number.

Clause 19. The system according to clause 12, wherein the machine learning model is trained using past authenticated user data.

Clause 20. The system according to clause 12, wherein the prestored property data item comprises a user registered location or a phone number.

Publications cited throughout this document are hereby incorporated by reference in their entirety. While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method, comprising:
    receiving, by a server computing device, from a remote computing device associated with a user via an application, in response to one of a plurality of low-risk access requests to at least one data resource, a programming call with a uniform resource locator (URL), wherein the URL comprises an encrypted portion of a second identification data item and the programming call is a HTTP request, the encrypted portion being generated by the remote computing device in response to acquiring and based at least in part on a first identification data item, wherein a low-risk access request includes the user selecting one or more of checking an account balance, a transaction status or account activities on the remote computing device and the user selecting to log into their account for high-risk access includes the user performing one or more of transferring funds or initiating a transaction;

decrypting, by the server computing device, the encrypted portion of the second identification data item wherein the second identification data item is account identification information;

obtaining, by the server computing device, a first context information item associated with the programming call, wherein the first context information item includes an Internet Protocol (IP) address to determine location;

inputting, by the server computing device, the first context information item into a machine learning model to generate a second context information item to derive a likelihood that the user is in a customary area of operation based on past fully authenticated operations;

extracting, by the server computing device, the second identification data item from the URL;

generating, by the server computing device, a third identification data item by decrypting the second identification data item;

retrieving, by the server computing device, a prestored property data item associated with the third identification data item;

comparing, by the server computing device, the second context information item with the prestored property data item; and transmitting, by the server computing device, requested data to the remote computing device to be displayed by the application when comparing the second context information with the prestored property data item produces a match, wherein the first, second and third identification data item are encrypted by the same key.

2. The method according to claim 1, further comprising designating, by a server computing device, the plurality of low-risk access requests and at least one high-risk access request.

3. The method according to claim 1, wherein the at least one data resource comprises an account in an electronic repository.

4. The method according to claim 3, wherein the first identification data item comprises an account number of the account in the electronic repository.

5. The method according to claim 1, wherein remote computing device is a smartphone, tablet or a personal computer.

6. The method according to claim 1, wherein acquiring, by the remote computing device, the first identification data item comprises scanning a quick response (QR) code or reading a near-field communication (NFC) tag.

7. The method according to claim 1, wherein the first context information comprises a phone number.

8. The method according to claim 1, wherein the machine learning model is trained using past authenticated user data.

9. The method according to claim 1, wherein the prestored property data item comprises a user registered location or a phone number.

10. A system, comprising:
    a plurality of processors of a server computing device; and at least one memory storing a plurality of computing instructions configured to instruct at least one of the plurality of processors to:

receive from a remote computing device associated with a user via an application, in response to one of a plurality of low-risk access requests to at least one data resource, a programming call with a uniform resource locator (URL), wherein the URL comprises an encrypted portion of a second identification data item and the programming call is a HTTP request, the encrypted portion being generated by the remote computing device in response to acquiring and based at least in part on a first identification data item, wherein a low-risk access request includes the user selecting one or more of checking an account balance, a transaction status or account activities on the remote computing device and the user selecting to log into their account for high-risk access includes the user performing one or more of transferring funds or initiating a transaction;

decrypting, by the server computing device, the encrypted portion of the second identification data item wherein the second identification data item is account identification information;

obtain a first context information item associated with the programming call, wherein the first context information item includes an Internet Protocol (IP) address to determine location;

input the first context information item into a machine learning model to generate a second context information item to derive a likelihood that the user is in a customary area of operation based on past fully authenticated operations;

extract the second identification data item from the URL;

generate a third identification data item by decrypting the second identification data item;

retrieve a prestored property data item associated with the third identification data item;

compare the second context information item with the prestored property data item; and transmit requested data to the remote computing device to be displayed by the application if when comparing the second context information with the prestored property data item produces a match, wherein the first, second and third identification data item are encrypted by the same key.

11. The system according to claim 10, wherein the plurality of computing instructions is further configured to instruct at least one of the plurality of processors to designate the plurality of low-risk access requests and at least one high-risk access request.

12. The system according to claim 10, wherein the at least one data resource comprises an account in an electronic repository.

13. The system according to claim 12, wherein the first identification data item comprises an account number of the account in the electronic repository.

14. The system according to claim 10, wherein acquiring the first identification data item comprises scanning a quick response (QR) code or reading a near-field communication (NFC) tag.

15. The system according to claim 10, wherein the first context information comprises a phone number.

16. The system according to claim 10, wherein the machine learning model is trained using past authenticated user data.

17. The system according to claim 10, wherein the prestored property data item comprises a user registered location or a phone number.

* * * * *